United States Patent [19]
Naumann

[11] Patent Number: 5,767,973
[45] Date of Patent: Jun. 16, 1998

[54] WHEELSET SENSING SYSTEM

[75] Inventor: Hans J. Naumann, Albany, N.Y.

[73] Assignee: Simmons Machine Tool Corporation, Albany, N.Y.

[21] Appl. No.: 597,833

[22] Filed: Feb. 7, 1996

[51] Int. Cl.$^6$ .................................................. G01B 11/24
[52] U.S. Cl. ........................................ 356/376; 356/385
[58] Field of Search ............................... 356/121, 376, 356/384–387; 250/559.22, 559.24

[56] References Cited

U.S. PATENT DOCUMENTS 4,798,963  1/1989  Wittkopp et al. .
4,932,784  6/1990  Danneskiod-Samsoe ............ 356/376

*Primary Examiner*—K. Hantis
*Attorney, Agent, or Firm*—Howard J. Greenwald

[57] ABSTRACT

A process for accurately and automatically measuring the properties of wheelset profiles while the wheelsets are in normal operation. In the first step of the process, the wheelset is rotated at a speed of at least 400 revolutions per minute while moved at a speed of at least 45 miles per hour, and a laser detection system is used to measure the profile of both wheels of the wheelset. In the second step of the process, the wheelset is rotated at a speed of less than 75 revolutions per minute while moved at a speed of less 6 miles per hour while its wheel profile properties are evaluated by a laser detection system.

5 Claims, 6 Drawing Sheets

WHEELSET SENSING SYSTEM

FIELD OF THE INVENTION

A process for sensing the condition of a railroad wheelset while such wheelset is in use.

BACKGROUND OF THE INVENTION

The rail network in North America is the largest in the world, operating with the high axle loads customarily used with heavy freight hauling railways. Unfortunately, the rail network in North America is also characterized by an inordinately high number of railroad accidents and derailments; these incidents occur at a substantially higher rate in North America than anywhere else in the world.

One of the causes of this safety problem is a lack of ability in the North American Railway system to readily and efficiently evaluate the condition of the wheel profiles of the wheelsets used in the locomotives, freight trains, and passenger trains.

In a publication entitled "Economics of Wheelset Management", which was presented in June of 1994 at the International Heavy Haul Association 1994 Mini-Conference held in Omaha, Nebr., applicant disclosed that excessive wear of railroad wheelsets causes many problems, including reduction of wheelset service life, an increase in the traction power required to move the trains, the production of extremely high dynamic forces during operation, damage to the wheelsets, rails, bearings, and vehicle structures during operation, derailments, and accidents.

Those skilled in the art are aware of the need to readily, efficiently, and automatically measure the properties of wheelsets under conditions of normal operation. However, to the best of applicant's knowledge, no such process currently exists.

It is an object of this invention to provide a process for readily, efficiently, and automatically measuring the properties of wheelsets during normal operation.

SUMMARY OF THE INVENTION

In accordance with this invention, there is provided a process for automatically measuring the properties of wheelsets. In the first step of this process, the wheelset is rotated at a speed of at least about 400 revolutions per minute while a laser beam is contacted with the wheel profile of the rotating wheelset. In the second step of the process, the wheelset is rotated at a speed of less about 75 revolutions per minute while several laser beams are contacted with different portions of the wheel profile.

In one embodiment, the process of the inventions is comprised of the sequential steps of: (a) rotating the wheelset at a speed of at least about 400 revolutions per minute while moving it at a speed of at least about 45 miles per hour, (b) impinging a first wheel of the with a multiplicity of laser beams to determine the wheel profile of the first wheel, (c) impinging a second wheel of the wheelset with a multiplicity of laser beams to determine the wheel profile of the second wheel, (d) rotating the wheelset at a speed of less than about 75 revolutions per minute while moving it at a speed of at less than about 6 miles per hour, and (e) impinging a first portion of the first wheel and a second portion of the first wheel with a multiplicity of laser beams.

BRIEF DESCRIPTION OF THE DRAWINGS

Applicant's invention will be described by reference to the following drawings, in which like elements are described by like numerals, and in which.

DESCRIPTION OF THE PREFERRED EMBODIMENTS

In the process of this invention, the dimensions and geometry of a wheel profile is preferably determined with the use of a laser beam.

Figure 1:
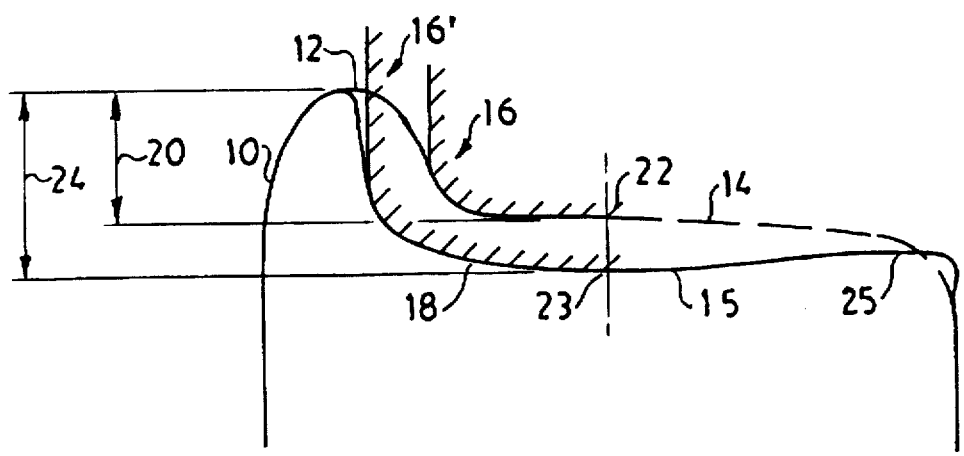
FIG. 1 is a sectional view of a worn wheel profile (full line) and an unworn wheel profile (dotted line)

FIG. 1 is a sectional view of a wheel profile 10. Referring to FIG. 1, it will be seen that full wheel profile 10 is comprised of the full profile 12 of the wheel flange, the full profile 14 of the wheel tread, and the rail head 16 projected against wheel profile 10.

FIG. 1 also illustrates the worn wheel flange and tread profile 18 with the railhead 16' projected against the worn wheel profile.

As will be apparent, the wear that occurs on the wheel profile 10 creates a substantially different flange and tread contour leading to a substantially narrower and higher flange.

The profile of a new wheel has a 1/20 taper. As is known to those skilled in the art, this taper is required to provide safe and efficient rail/wheel interaction.

Referring again to FIG. 1, it will be seen that the wearing of the wheel profile 12 and 14 substantially reduces the required taper and causes the production of an undesired hollow flange 15. The presence of hollow flange 15 causes an uncontrolled lateral acceleration of the wheelset in the rail.

As will be apparent to those skilled in the art, in the undesired hollow tread the slope of the worn tread contour changes from a negative taper to a positive taper at about tape line 23 and increases to a larger wheel diameter towards the wheel edge 25. By comparison, the slope of the unworn tread does not change from a negative taper to a positive taper, or from a positive taper to a negative taper.

Referring again to FIG. 1, it will be seen that, in the worn wheel profile 18, the height 24 between tape line 23 and flange 12 is substantially greater than originally designed (see original height 20). This undesirable property is known as "high flange".

In the process of this invention, the wheel profile of a wheel rotating at different speeds is measured by means of a laser beam.

Means for measuring various properties of a moving object with one or more laser beams are well known to those skilled in the art. Thus, e.g., reference may be had to U.S. Pat. Nos. 5,443,537 (adjusting wheel and axle alignment using laser beam equipment), 5,440,923 (measuring the inclination of a vehicle by laser ranging units), 5,371,581 (use of a horizontally rotating beam from a laser rangefinder to detect and measure the distance to ground objects which may present a hazard to a helicopter), 5,314,037 (an automobile collision avoidance system based on laser radars), 5,274,433 (laser-based wheel alignment system), 5,240,359 (machining apparatus in which variations in the level of rails are determined by a sensor which monitors a reference defined by a planar laser beam), 5,048,954 (laser-based wheel alignment system), 4,413,684 (laser-controlled ground leveling device), and the like. The disclosure of each of these United States patents is hereby incorporated by reference into this specification.

As is known to those skilled in the art, laser beams have also been used to measure the properties of railroad wheelsets. Thus, the Loram Maintenance of Way, Inc. company (of 3900 Arrowhead Drive, Hamel, Minn.) has developed "Loram's Automatic Wheel Inspection System" ("AWIS"). This system uses an optical imaging system to collect wheel specifications instantly. Different points of data are transmitted to a central computer, where they can be compared, sorted, and retrieved according to individual needs. Actual data points displayed include train direction, train number, speed, date, wheel dimensions (such as flange height, flange thickness, rim thickness, angle of attack, and wheel diameter), and the like.

Figure 2:
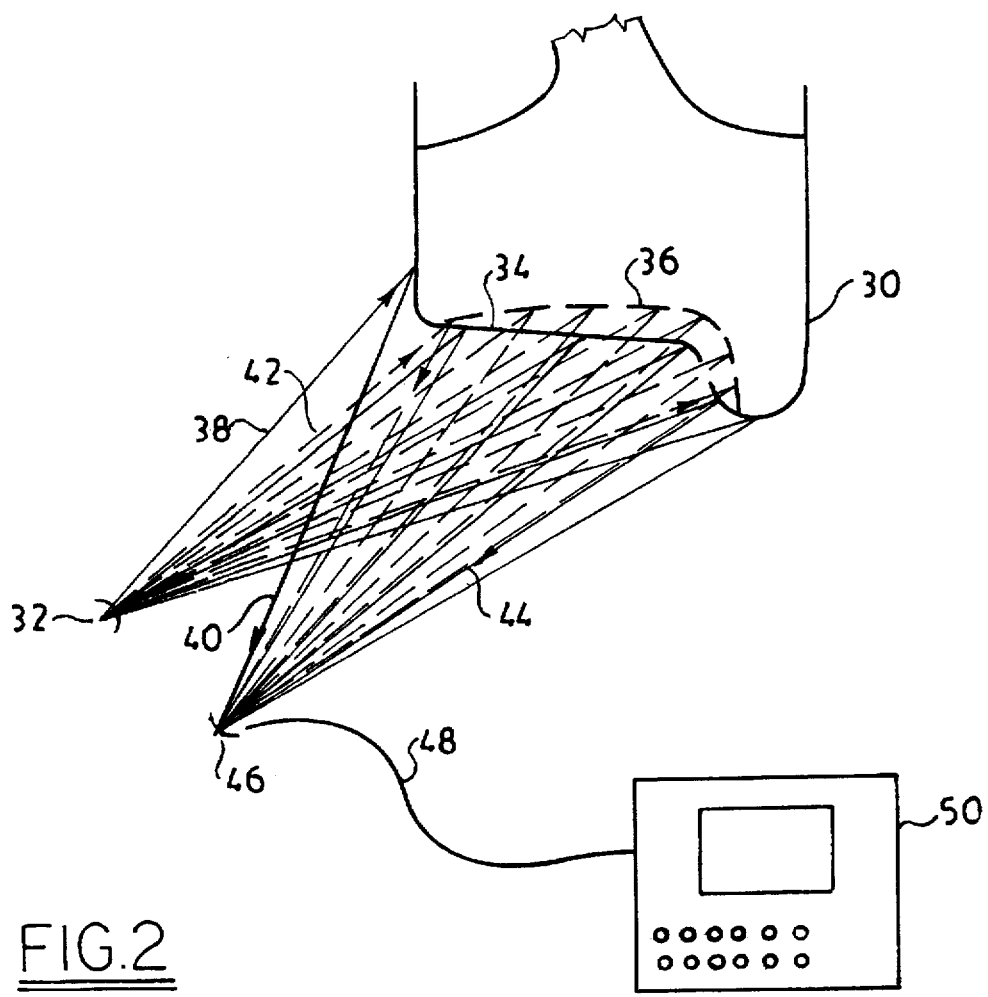
FIG. 2 is schematic view of one preferred process for sensing a part of a wheel profile.

FIG. 2 is a schematic view of a wheel profile 30 which, during operation under normal conditions, is contacted with a multiplicity of rays from a laser 32. Two depiction's are wheel profile 30 are presented. The original wheel profile 34 is shown in solid line, and the wheel profile 36 which occurs after substantial wear is shown in dotted line. The laser beams 38 which impact original wheel profile 34 are reflected as reflected beams 40. By comparison, the laser beams 42 which impact worn wheel profile 36 are reflected as reflected beams 44.

The laser beams reflected from either original wheel profile 34 or worn wheel profile 36 are received by sensor 46. In one embodiment, sensor 46 is an optical system comprised of cameras. In other embodiments, other conventional means for sensing reflected laser rays are used.

Referring again to FIG. 2, and in the preferred embodiment depicted therein, information sensed by sensor 46 is transmitted via data link 48 to computer 50.

In the process of this invention, the system depicted in FIG. 2 may be used to measure the extent to which, if any, a wheel rotating at a speed of at least about 400 revolutions per minute has a high flange and/or a hollow tread. The system depicted in FIG. 3 may be used to measure the extent to which, if any, a wheel rotating at a speed of less than about 75 revolutions per minute has a high flange, flange height, flange thickness, rim thickness, wheel diameter, and tread contour.

Figure 3:
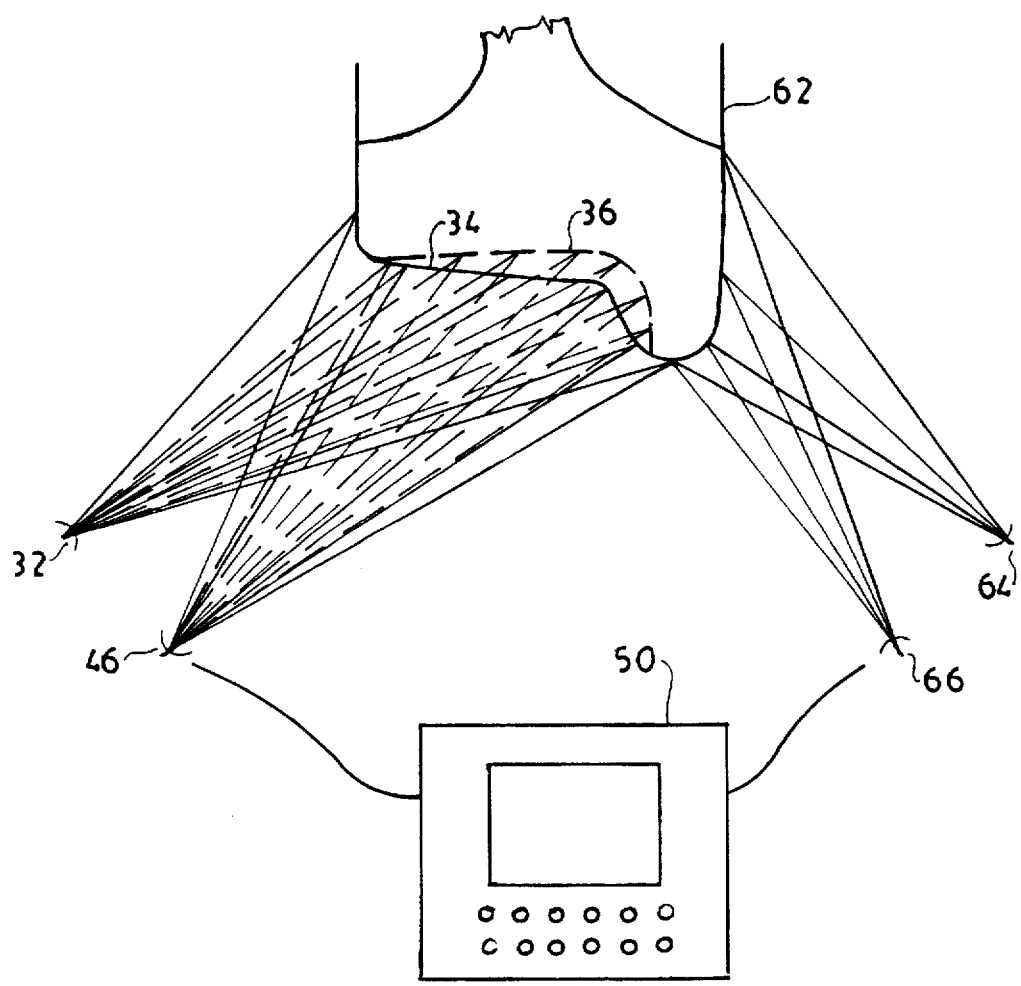
FIG. 3 is a schematic view of another preferred process for sensing another part of a wheel profile.

In the embodiment depicted in FIG. 3, unnecessary detail has been omitted for the sake of simplicity of representation. In this embodiment, as is illustrated in FIG. 3, a separate set of measurements of the back side 62 of the wheel is made by means of laser 64 and sensor 66. In one embodiment, these measurements are made at the same time the measurements are made with laser 32 and sensor 46. In another embodiment, these measurements are made at a different time and under different conditions. Thus, e.g., they may be made while the wheel is stationary, or when the wheel is moving at a low speed such as, e.g., a speed less than about 75 revolutions per minute.

Figure 4:
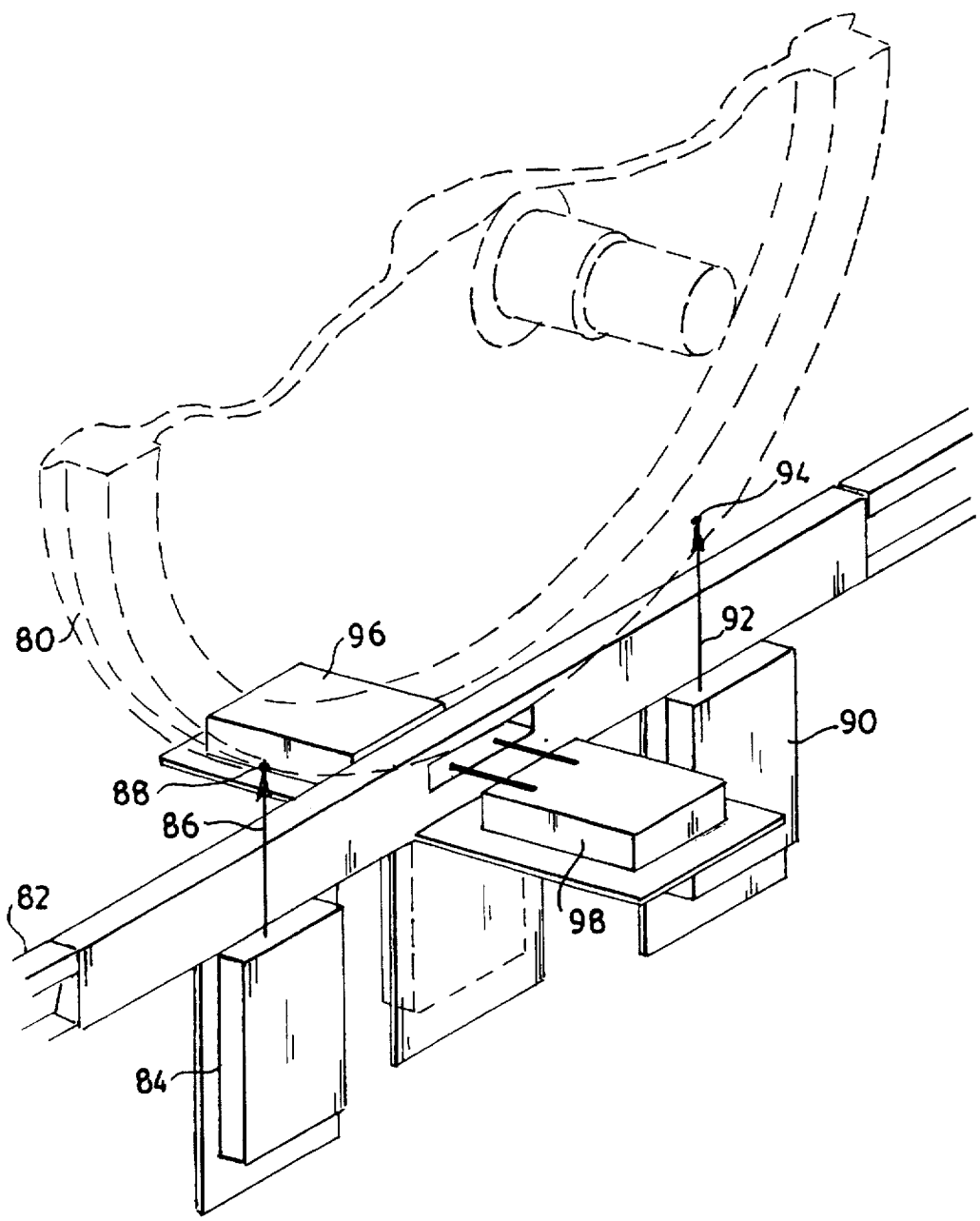
FIG. 4 is a schematic view of yet another preferred process for sensing portions of a wheel profile.

FIG. 4 is a partial perspective view of a wheel 80 of a wheelset riding on a rail 82. In the apparatus depicted in FIG. 4, laser 84 emits a beam 86 which contacts wheel 80 at point 88. Similarly, laser 90 emits a beam 92 which contacts wheel 80 at point 94. Beams 86 and 92 are reflected back to units 84 and 90, which also contain means for sensing and evaluating the reflected beams. This information is then used to calculate the diameter of wheel 80 at its tape line.

Referring again to FIG. 4, it will be seen that laser units 96 and 98 are disposed on either side of wheel 80 and, with the use of laser beams appropriately directed towards the wheel flange, can be used to determine the flange thickness and the flange height.

Figure 5:
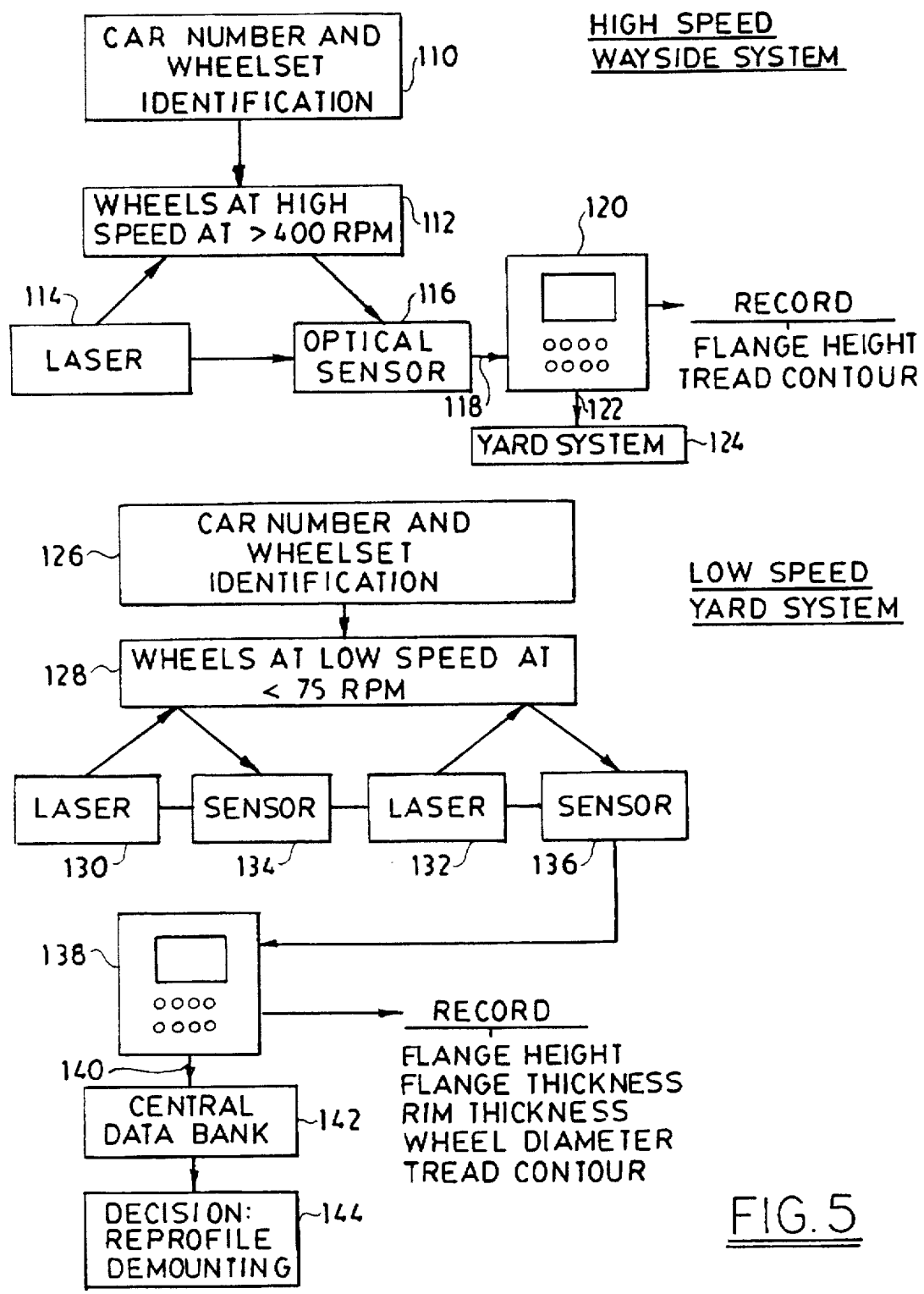
FIG. 5 is a flow diagram of one preferred process of the invention.

FIG. 5 is a flow diagram illustrating one preferred process of the invention. In step 110, the identity of a railcar and the number of the wheelset being measured is determined by conventional means.

In step 112, the flange height and the tread contour of the wheel rotating at a speed greater than 400 revolutions per minute is determined by the use of laser 114 and optical sensor 116.

The information from optical sensor 116 is fed via line 118 to computer 120, which produces a record of measurements made. If computer 120 determines that the taper of the wheel measured is less than zero, then it will issue an alert.

As is known to those skilled in the art, the taper of the wheel profile is the slope of the wheel profile; and, in an unworn wheel profile, always exceeds zero.

In a worn wheel profile, by comparison, one or more hollows exist, and portion of the profile may have a taper above zero, and another portion may have a taper below zero (see FIG. 1).

Referring again to FIG. 5, if computer 120 detects a taper below zero in the tread contour, it will report the presence of such a hollow in the wheel contour to the next railroad yard in the line equipped with a low speed measuring system. By way of illustration, such an alert may be sent vial line 122 to yard system 124. Alternatively, or additionally, the alert may be sent to a central data bank.

Referring again to FIG. 5, as the car which has been flagged passes into the yard, its car number and the relevant wheelset are again identified by conventional means in step 126. Thereafter, in step 128, the wheels at low speed (less than 75 revolutions per minute) are then evaluated by lasers 130 and 132, and optical sensors 134 and 136. In this low speed measurement system, one can measure the flange width, the flange thickness, the rim thickness, the wheel diameter, and the tread contour. Because the wheels are rotating a low speed, the measurements made are more accurate than those made at high speed. The information generated is fed to computer 138, which makes a record of the data produced. If it is determined that the wheel(s) involved are unsatisfactory, a signal is then sent via data link 140 to central data bank 142. Based on the data furnished, a decision 144 now may be made as to whether to remove the wheels and the wheelset from service for reprofiling or demounting.

Figure 6:
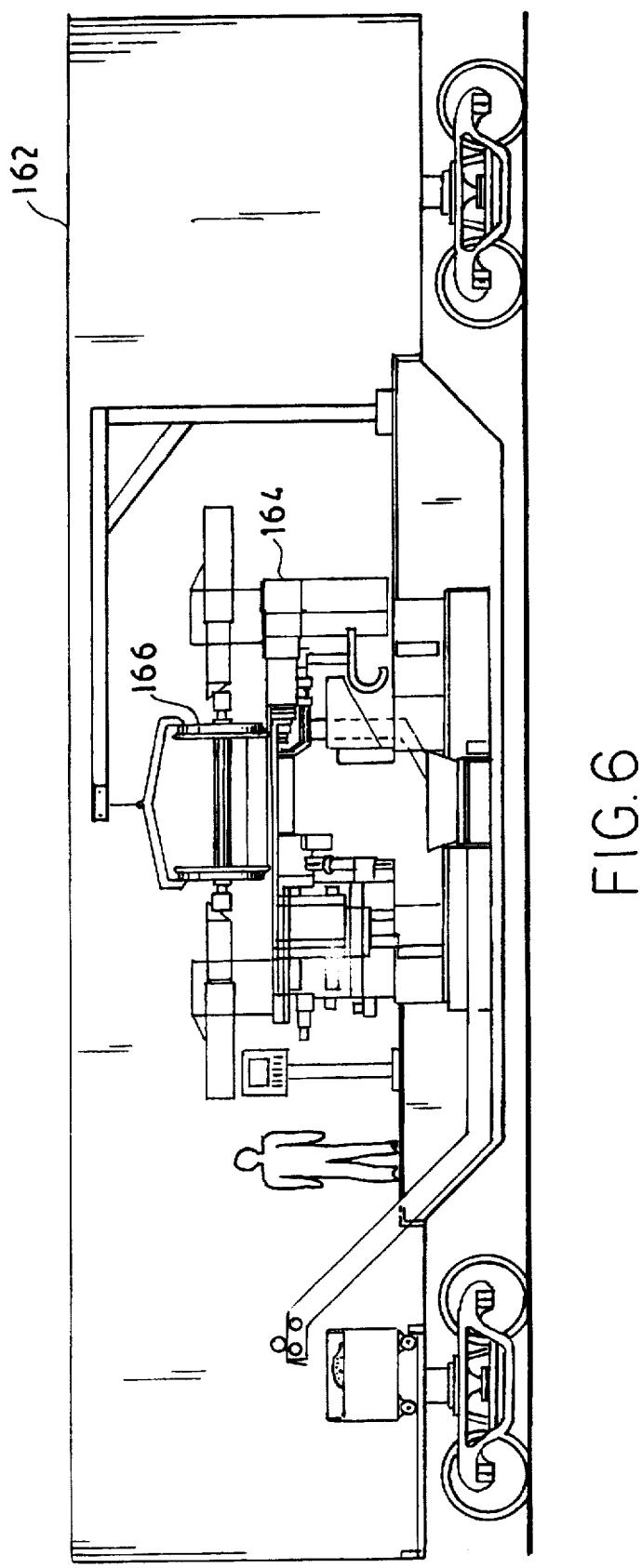
FIG. 6 is a schematic view of a portable wheelset truing machine.
Figure 7:
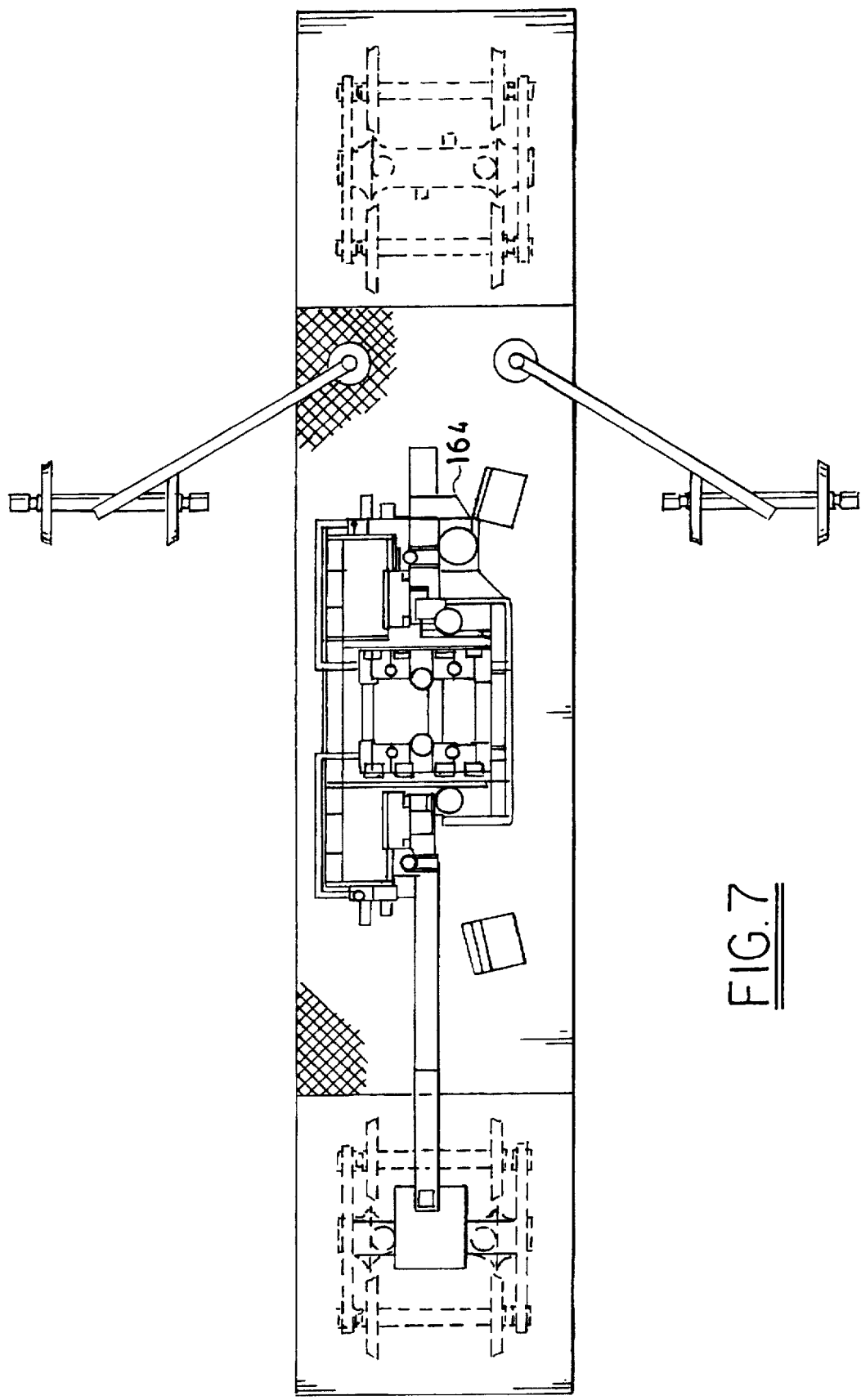
FIG. 7 is a top view of the truing machine of FIG. 6.

FIG. 6 is a schematic view of a portable wheel profiling system 160 comprised of a rail car 162 and a wheelset reprofiling system 164. FIG. 7 is a top view of the profiling system of FIG. 6.

One may use any of the wheel reprofiling systems known to those skilled in the art such as, e.g., those systems described in U.S. Pat. Nos. 1,071,615, 1,250,869, 1,432,579, 2,431,654, 2,622,378, 2,630,725, 2,645,003, 2,677,307, 2,678,487, 2,727,343, 2,823,493, 3,044,368, 3,540,103, 3,540,164, and the like. The disclosure of each of these United States patents is hereby incorporated by reference into this specification.

Referring again to FIGS. 6 and 7, it will be seen that wheelset 166 is preferably loaded into car 162 through either the top of such car or its side.

In the embodiment depicted in FIGS. 6 and 7, the reprofiling is preferably conducted by milling technology which produces small chips which can readily be disposed of. As will be apparent to those skilled in the art, this is important for the environment of the profiling machine installation.

I claim:

1. A process for measuring the wheel profiles of wheels of a wheelset, comprising the steps of sequentially:

(a) rotating said wheelset at a speed of at least about 400 revolutions per minute while moving said wheelset at a speed of at least about 45 miles per hour, in order to measure the presence of a high flange or a hollow tread on the wheel profiles of said wheelset, (b) impinging a first wheel of said wheelset with a multiplicity of laser beams to determine the wheel profile of said first wheel, (c) impinging a second wheel of said wheelset with a multiplicity of laser beams to determine the wheel profile of said second wheel, and (d) thereafter, rotating said wheelset at a speed of less than about 75 revolutions per minute while moving said wheelset at a speed of at less than about 6 miles per hour while impinging said wheelset with a multiplicity of laser beams in order to measure the high flange, flange height, flange thickness, rim thickness, wheel diameter, and tread contour on said wheel profiles of said wheelset.

2. The process as recited in claim 1, wherein while said wheelset is rotated at said speed of 400 revolutions per minute, each of its first wheel and its second wheel is evaluated to detain whether the wheel profile of such wheel has a taper of from about $1/17$ to about $1/23$.

3. The process as recited in claim 1 wherein, while said wheelset is rotated at said speed of 400 revolutions per minute, each of its first wheel and its second wheel is evaluated to determine whether the wheel profile of such wheel has a hollow wheel tread.

4. The process as recited in claim 3, wherein said wheelset is evaluated with an optical sensor.

5. The process as recited in claim 4, wherein said optical sensor is comprised of a camera.

* * * * *